April 3, 1928.  1,664,479
E. A. MacKEAN
THROTTLE CONTROL FOR AUTOMOBILES
Filed Sept. 30, 1927
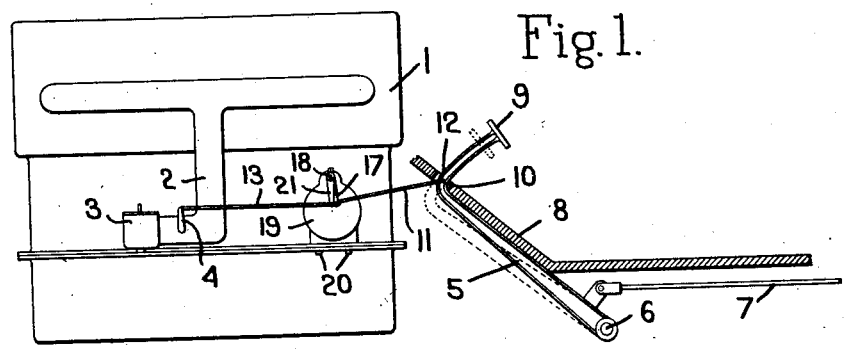
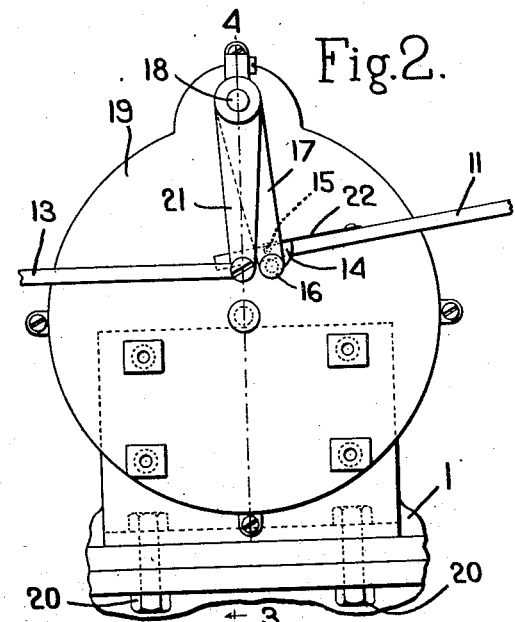
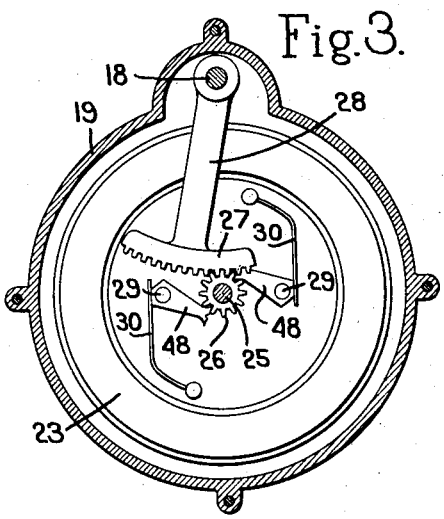
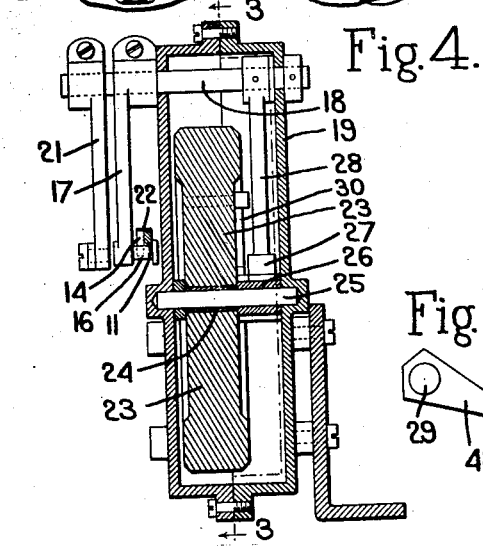
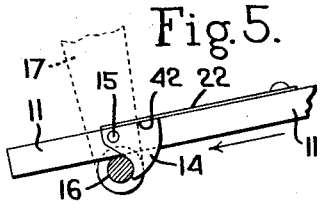
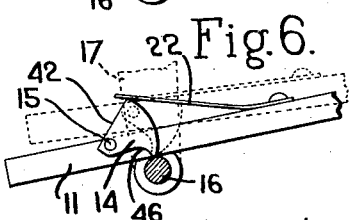
Inventor.
Emroe A. MacKean
by Heard Smith & Tennant.
Attys.

Patented Apr. 3, 1928.

1,664,479

UNITED STATES PATENT OFFICE.

EMROE A. MacKEAN, OF SAUGUS, MASSACHUSETTS.

THROTTLE CONTROL FOR AUTOMOBILES.

Application filed September 30, 1927. Serial No. 223,179.

This invention relates to the throttle control for automobiles and it has for its object to so connect the throttle with the pedal controlling the foot brake that said throttle will be actuated by the initial depressing movement of said pedal but will be released when the pedal is depressed to a position sufficient to apply the brake.

In most automobiles the foot brake connections are such that the foot pedal has a certain amplitude of movement before the brake is applied, in some instances it being necessary to depress the pedal through nearly one-half of its entire stroke before obtaining any application of the brakes. I take advantage of this fact in my invention by so connecting the throttle to the foot pedal that the throttle will be actuated by the initial movements of the pedal which are insufficient to apply the brake.

My invention also provides a construction whereby if the foot pedal is suddenly depressed, as is usually the case when the brakes are applied, the connection to the throttle will be disrupted so that the throttle will assume idling position as the brakes are applied.

My improvements are in the nature of a safety addition to an automobile because in the case of an emergency the natural thing for the driver to do is to step hard and quickly on the brake pedal and many accidents are caused by the fact that in an emergency the operator forgets to shift his foot from the accelerator to the brake before giving the sudden downward pressure, the result being that the car is accelerated instead of having the brake applied as was intended. With my invention, both the throttle and the brake are controlled by the same pedal so that no shifting from one control to another is required. The movements of the accelerator are usually of a gentle nature and with my invention the gentle initial movements of the foot pedal are those which control the accelerator. In an emergency, however, when the operator's instinct is to press suddenly on the foot pedal to apply the brakes such action automatically disrupts the connection to the throttle so as to cut the engine to idling speed and at the same time applies the brakes.

In order to give an understanding of the invention I have illustrated in the drawings a selected embodiment thereof which will now be described after which the novel features will be pointed out in the appended claims.

Fig. 1 is a fragmentary view illustrating a portion of an automobile equipped with my invention;

Fig. 2 is a side view of the inertia device;

Fig. 3 is a section on the line 3—3, Fig. 4;

Fig. 4 is a section on the line 4—4, Fig. 2;

Figs. 5 and 6 are fragmentary views illustrating the disruptable portion of the connection.

Fig. 7 is a fragmentary view of the ratchet and pawl.

In Fig. 1, 1 indicates generally the engine of an automobile, 2 the intake pipe, 3 the carbureter, 4 the lever controlling the throttle, and 5 the foot treadle controlling the service brake, said pedal being pivoted at 6 and connected to the brake through a suitable connection 7.

The body of the pedal is located below the foot boards 8 of the automobile as usual and the upper end 9 projects through the opening 10 in said foot boards.

The foot pedal is connected to the throttle lever 4 by means which are operative to control the throttle during the initial movements of the treadle, such for instance as those between the full and dotted line positions Fig. 1. The connections to the brake will be so adjusted that this initial movement of the pedal 5 will have no effect in applying the brake, the brake not being applied until after the pedal 5 has been depressed below the dotted line position. The connection I employ between the pedal 5 and the throttle arm 4 is one which will become automatically disrupted when the brake pedal is given a sudden movement below the dotted line position so that if the brake is applied suddenly the throttle is automatically restored to idling position.

While various devices may be employed for accomplishing this end I deem that herein shown to be satisfactory.

The brake pedal 5 has a link 11 pivoted thereto at 12, said link being connected through a disruptable connection to another link 13 which is pivoted to the throttle arm 4. The disruptable connection is herein shown in the form of a spring-pressed latch 14 which is pivoted to the link 11 at 15 and which normally engages a pin 16 carried by the end of an arm 17 which is fast on a rock shaft 18, the latter being journalled in a housing 19 that is shown as secured to the engine 1 by suitable bolts 20. This rock shaft 18 has another arm 21 fast thereon to which the link 13 is pivotally connected. The latch 14 is normally held in its operative position shown in Fig. 5 by means of a spring 22 which engages the flat face 42 of said latch 14. The latch is provided with a concave face 46 arranged to engage the pin 15 and the shape of said latch and the strength of the spring 22 are such that when the link 11 is moved to the left, Fig. 5, with a gentle movement the latch will be maintained in its operative position shown in Fig. 5 by the spring 22 and the movement of the link 11 will thus be transmitted to the arm 17 thereby turning the rock shaft 18, and through the arm 21 swinging the throttle arm 4 and opening the throttle.

Means are provided whereby if the foot pedal 5 is given a sudden depressing movement sufficient to apply the brakes the latch 14 will become disconnected from the pin 16 as shown in Fig. 6 so that the motion of the pedal will not be transmitted to the throttle and the latter will be released from control of the treadle and may thus assume idling position. To accomplish this I provide an inertia device which is in the form of a rotary weight 23 that is situated within the housing 19. This weight is mounted to rotate freely on a sleeve 24 which is in turn supported by a shaft 25 carried by the housing. The sleeve 24 is formed with a pinion 26 with which meshes a segmental gear 27 carried on the end of an arm 28 that is fast on the rock shaft 18. The sleeve 24 is connected to the inertia weight 23 by a pawl and ratchet device which comprises a pair of pawls 48 pivoted to the inertia device at 29 and normally engaging the teeth of the pinion 26, said pawls being acted upon by springs 30 which yieldingly hold them in operative position.

With this arrangement it will be observed that assuming the brake pedal is in its full line position the initial downward movement of the brake pedal, if it is a gentle one, such as would naturally be used in controlling the throttle, will move the link 11 to the left, Figs. 1 and 5, and will swing the lever arm 17 to the left through the medium of the latch 14. Such a movement of the lever 17 will rock the shaft 18 and will give a turning movement to the inertia device and at the same time will rock the arm 21 and operate the connection 13 leading to the throttle arm 4. So long as the movement of the pedal 5 is a gentle one within the limits indicated substantially by the dotted and full line position, Fig. 1, such movement will control the throttle in the same manner as the throttle is controlled by the ordinary accelerator, the inertia member 23 being given a rotary movement commensurate with the movements of the pedal 5. If, however, the brake pedal 5 is given a sudden depressing movement, such as one would naturally give it in case of an emergency, the resistance offered by the inertia of the inertia device 23 will overcome the resiliency of the spring 22 so that the latch 14 will yield backwardly as shown in Fig. 6 and will thus wipe over and become released from the pin 16. When this occurs the connection between the link 11 and the throttle is disrupted so that the brakes can be applied without affecting the throttle. Moreover, as soon as the latch 14 has been disconnected from the pin 16 the spring connected to the throttle will immediately restore the throttle to idling position during which restoring movement the pinion 26 will click over the pawls 48. Thus during the restoring movement the spring of the throttle does not have to move the inertia device. My invention, therefore, obviates the possibility of accidentally accelerating the car at the time it is least desirable to do so.

As soon as the brake pedal has been released after the latch has been automatically disconnected from the pin 16 the return movement of the brake pedal will restore the link 11 to its normal position during which the latch will wipe over the pin 16 as shown by dotted lines, Fig. 6, and said latch will thus automatically be restored to its operative position.

If it is desired to apply the brakes gradually then the operator will first give the brake pedal a slight kick or quick sudden movement sufficient to disconnect the latch 14 from the pin 16 and thereafter the brake pedal may be operated as easily as desired and without in any way affecting the throttle. The release of the pressure on the brake pedal will automatically restore the connection between the brake pedal and throttle as above described.

I claim.

1. In an automobile, the combination with a foot brake pedal, of a throttle-controlling member, a connection between said member and pedal which will operate during the initial movement of the pedal to actuate the throttle-controlling member but which will become disrupted by sudden movement of said pedal.

2. In an automobile, the combination with a foot brake pedal, of a throttle-controlling member, a connection between said member and pedals which will transmit gentle movements from the pedal to the controlling member but which is disruptable under heavy strain, an inertia device associated with said connection and which interposes sufficient resistance to a sudden movement of the pedal to cause said connection to be disrupted.

3. In an automobile, the combination with a foot brake pedal, of a throttle-controlling member, an inertia device, a connection between the latter and the throttle-controlling member, and a disruptable connection between said inertia device and the pedal.

4. In an automobile, the combination with a foot brake pedal, of a throttle-controlling member, an inertia device, a connection between the latter and the throttle-controlling member, and a connection between said inertia device and pedal which will transmit gentle movements from the pedal to the inertia device but which will become disrupted upon a sudden movement of the pedal.

In testimony whereof, I have signed my name to this specification.

EMROE A. MacKEAN.